United States Patent
Ebert et al.

(10) Patent No.: US 7,410,065 B2
(45) Date of Patent: Aug. 12, 2008

(54) MEMBRANE FOR THE SEPARATION OF MATERIAL MIXTURES AND METHOD FOR PRODUCTION THEREOF

(75) Inventors: Katrin Ebert, Luneburg (DE); Bastian Ruffmann, Geesthacht (DE); Joachim Koll, Hamburg (DE); Axel Wenzlaff, Escheburg (DE)

(73) Assignee: GKSS-Forschungszentrum Geesthacht GmbH, Geesthacht (DE)

( * ) Notice: Subject to any disclaimer, the term of this patent is extended or adjusted under 35 U.S.C. 154(b) by 0 days.

(21) Appl. No.: 11/789,513

(22) Filed: Apr. 25, 2007

(65) Prior Publication Data

US 2007/0193946 A1     Aug. 23, 2007

Related U.S. Application Data

(63) Continuation of application No. PCT/EP2005/009609, filed on Sep. 7, 2005.

(51) Int. Cl.
    *B01D 29/00*     (2006.01)
    *B01D 39/00*     (2006.01)
    *B23C 65/00*     (2006.01)
    *B01D 15/00*     (2006.01)

(52) U.S. Cl. .............. 210/490; 210/502.1; 210/500.42; 210/640; 264/41

(58) Field of Classification Search ............ 210/500.42, 210/502.1, 490, 640, 500.27, 500.23, 500.25; 95/45, 52; 96/6; 264/41; 94/6
See application file for complete search history.

(56) References Cited

U.S. PATENT DOCUMENTS

| | | | | |
|---|---|---|---|---|
| 3,951,621 | A * | 4/1976 | Hughes et al. | 95/44 |
| 4,200,714 | A * | 4/1980 | Mahoney et al. | 526/68 |
| 4,915,834 | A * | 4/1990 | Bruschke | 210/321.84 |
| 4,941,976 | A * | 7/1990 | Bartels et al. | 210/490 |
| 5,004,861 | A | 4/1991 | Pasternak et al. | |
| 5,059,327 | A | 10/1991 | Takegami | |
| 5,127,925 | A * | 7/1992 | Kulprathipanja et al. | 95/54 |
| 5,141,649 | A * | 8/1992 | Pasternak et al. | 210/640 |
| 6,062,866 | A * | 5/2000 | Prom | 434/268 |
| 6,440,309 | B1 * | 8/2002 | Cohen | 210/640 |
| 6,451,260 | B1 * | 9/2002 | Dusterhoft et al. | 422/68.1 |
| 7,138,006 | B2 * | 11/2006 | Miller et al. | 95/45 |

FOREIGN PATENT DOCUMENTS

| | | |
|---|---|---|
| DE | 3220570 | 12/1983 |
| DE | 4004153 | 8/1991 |

* cited by examiner

*Primary Examiner*—Ana M Fortuna
(74) *Attorney, Agent, or Firm*—Michaud-Duffy Group LLP

(57) ABSTRACT

The invention relates to a membrane for the separation of material mixtures by the principle of vapor permeation or pervaporation, in particular for the dewatering of organic solvents, comprising at least one support layer and at least one material-selective separation layer located thereon, and a method for production of such a membrane. The material-selective separating layer is made from polyvinyl alcohol, containing at least one metallic element and/or a derivative thereof. The method includes the addition of polyvinyl alcohol to a solvent, adding an organometallic compound to the solvent/polyvinyl alcohol mixture, and then applying the solvent/polyvinyl alcohol/organometallic compound mixture to the support layer as the material-selective separating layer.

21 Claims, No Drawings

US 7,410,065 B2

MEMBRANE FOR THE SEPARATION OF MATERIAL MIXTURES AND METHOD FOR PRODUCTION THEREOF

CROSS-REFERENCE TO RELATED APPLICATIONS

This application is a continuation of and claims priority to International Patent Application No. PCT/EP2005/009609 filed on Sep. 7, 2005, which claims priority to German Patent Application No. 10 2004 053 401.0 filed on Nov. 5, 2004, subject matter of these patent documents is incorporated by reference herein in its entirety.

FIELD OF THE INVENTION

The invention concerns a membrane for the separation of material mixtures according to the method of vapor permeation or pervaporation, especially for the removal of water from organic solvents, including at least one carrier layer and on the carrier layer at least one separation layer. It also concerns a method for the making of such a membrane.

BACKGROUND OF THE INVENTION

Known in the state of the art are numerous membranes in which the material-selective separation layer is made of polyvinyl alcohol. A chemical stability of these membranes and of the material-selective separation layers, for example with respect to water, is thereby achieved in that the polyvinyl alcohol is cross-linked. The known membranes of this kind are suited principally for use in the separation of vaporous media or of gas-vapor mixtures up to temperatures of 105° C. At temperature exceeding 105° C. stability problems occur with such membranes. Such a membrane, wherein the material-selective separation layer is made of cross-linked polyvinyl alcohol is described in DE-A-32 20 570.

However other membranes based on polyvinyl alcohol are known, for example from DE-C-40 04 153, wherein a membrane is described having an ordered structure with a large microcrystalline portion, with the crystallization having been achieved by holding the solution at temperatures from −10 to +10° C. for several days.

For this membrane also the guaranteed stability of the membrane does not hold for temperatures higher than 105° C.

In summary it can be stated that all known membranes whose material-selective separation layer is made on the basis of polyvinyl alcohol at temperatures lying above 105° C. do not exhibit sufficient mechanical and chemical stability for the dewatering of organic solvents by means of vapor permeation and also have an unsatisfactory stability with regard to the formation of a condensate on the outer surface of the membrane. Because of their unsatisfactory mechanical stability at temperatures above 105° C. they also have the disadvantage that they are not suited to being drawn upon for the making of padded membranes (membrane pads, membrane pockets), since such membrane elements for their making have to be welded at their edge regions, which with previous membranes based on a material-selective separation layer of polyvinyl alcohol is not possible.

SUMMARY OF THE INVENTION

It is accordingly the object of the present invention to provide a membrane of the previously mentioned kind which has a higher solvent stability then previously known membranes, and which has a temperature stability which extends into the region of +105° C. and higher, with such membrane being weldable at its edge regions so that it can also be used in the making of padded membranes (membrane pads, membrane pockets).

It is further the object of the present invention to provide a method by way of which such membranes can be made in a simple way and in a simple way can be conditioned to the desired separation purpose and whereby membranes of this kind can easily be made and can be assembled as membrane pads and be connected with one another at their edge regions by welding.

The above-described objects are met with regard to the membrane in that the material-selective separation layer is made of a polyvinyl alcohol which includes at least one metallic element and/or at least one metallic element derivative.

The metals are preferably metals from the group magnesium, aluminum, but can preferably also be zirconium and titanium, and can be in metallic or more complex form or as their insoluble salts, oxides and hydroxides.

In general it can be said that the derivatives are for example, salts, oxides and oxihydroxides and organometallic compounds.

The advantage of the membrane according to the invention resides essentially in that the membrane is temperature stable in the region of 150° C. and is accordingly suited to the dewatering of organic solvents by means of vapor penneation or by pervaporation and, for example, for the dewatering of solvent-water mixtures having a water content of up to 20 wt %.

A further substantial advantage is, that the membrane made in accordance with the invention is weldable at its edge regions so that the membrane is suited to the making of padded membranes. Accordingly the use of an adhesive or the like is superfluous, with an adhesive basically representing a stability problem in the case of such padded membranes. Moreover, by means of the membrane of the invention a spatial swelling of the membrane from soaking in inorganic separation media can be tolerated since the individual membrane pads in a separation device are freely arranged and no issues in regard to a limited stability of the membrane pad because of its welded connection exist, as would otherwise exist if these membranes were made of non-weldable material as previously was the case.

DETAILED DESCRIPTION OF THE PREFERRED EMBODIMENTS OF THE INVENTION

According to an advantageous embodiment of the membrane the molecular weight of the polyvinyl alcohol is so set that it lies essentially in the region between 20,000 and 200,000 g/mol, preferably in the region between 100,000 to 150,000 g/mol. Since the molecular weight of the polyvinyl alcohol is chosen in dependence on the later use of the membrane for specific separation purposes and can be set, the membranes according to the invention can be conditioned so that they have suitable selectivities and flows for the especially chosen separation purpose.

The polyvinyl alcohol, which is made by hydrolysis, has preferably a hydrolysis degree essentially in the region between 50 and 100%, and especially preferably in a region between 90 and 100%.

The polyvinyl alcohol for the formation of the material-selective separation layer is preferably dissolved in a solvent, for example distilled water, with preferably the concentration of the solution lying essentially in the region between 0.5 wt.

% to the solubility limit of the polyvinyl alcohol, especially preferably essentially in the region between 1 and 5 wt. %.

The previously mentioned metallic constituents of the membrane, or their derivatives, lie in an essentially uniformly distributed manner in the separation layer.

The carrier or support layer of the composite membrane according to the invention is preferably formed so as to be porous and can optionally be made of suitable polymers, for example, polyacrylnitril, polyamide mid, polyetherimid, polyethersulfon, and also other membrane forming polymers as well as their modifications. For the support layer other materials can also be used, from which inorganic membranes are made, and also inorganic-organic materials can be used such as one uses in connection with so called blended membranes.

The present invention also resides in a method for making the membrane wherein:
 a. polyvinyl alcohol is added to a solvent,
 b. subsequently an organometallic compound is added to the solvent/polyvinyl alcohol mixture, and then
 c. the solvent/polyvinyl alcohol/organometallic compound mixture is applied to the support layer as a material-selective separating layer.

The support layer is actually a porous membrane which, as seen above, can also be made as a porous polymer membrane and in this case can be made according to the known phase-inversion process. In this case a solution consisting of the chosen polymer and the solvent or of the chosen polymer-filling material-solvent is applied to a suitable mechanical carrier, for example a felt. Then they are separated in an insoluble agent. As the carrier for the porous membrane, along with felts, woven fabrics are also suitable. The insoluble agent of the separation process is preferably water and is preferably mixable with the solvent. A further processing with water serves to remove the remainder of the solvent and can favorably influence the separation performance of the membrane. Then the manufactured porous support layer, for example in the form of the above described porous polymer membrane, is dried, for example in an air stream, according to methods known to specialists in this art. The used support layers have a narrow pore radius distribution and such an average pore radius that the molecules of the solvent/polyvinyl alcohol/organometallic compound mixture cannot penetrate into the pores of the porous support layer.

The material-selective separation layer of the composite membrane made by means of the method of the invention has preferably a thickness in the range of from 0.2 to 10 µm, and more preferably a thickness in the range of from 1 to 5 µm.

According to a further embodiment of the method the organometallic compound preferably before its addition to the solvent/polyvinyl alcohol mixture, is complexed, whereby the complexing for example can take place by means of acetylation. The complexing has the result of hindering the spontaneous condensation of the organometallic compound during its addition to the remaining polyvinyl alcohol solution.

Principally each suitable organometallic compound for addition to the solvent/polyvinyl alcohol mixture in regard to the carrying out of the inventive method is also suitable in regard to the manufactured membrane. Preferably the organometallic compound is tetraethylorthotitanate or tetraorthopropylenzirkonate. In the material-selective separation layer, after the conclusion of the method the organotitanium or the organozirconium is converted to minerals which are distributed in the form of oxides or their hydroxide derivatives, or which are formed as organometallic chelates, which are interlinked as insoluble rigid bodies.

After the support layer, made in accordance with the desired porous carrier, is available and the solvent/polyvinyl alcohol/organometallic compound mixture has been applied to the support layer the so formed advance stage of the later composite membrane is subjected to a thermal treatment. By means of a first thermal treatment at a temperature in the region of 100° C. it is first dried.

In a second thermal treatment the obtained composite membrane is subjected to a temperature in the region of +120° C. to +200° C., preferably +160° C. to +180° C., for the interlinking of the support layer with the material-selective layer and for the in situ formation of the metal oxide or a polychelate complex or a chelate-polyvinyl alcohol-condensation compound or one of the previously mentioned metal derivatives in the material-selective layer. By means of the first and second thermal treatments the complexing agents are partially, predominantly or entirely removed and thereby make possible the hydrolysis of the organometallic compound. Among the organometallic compounds, which in the sense of the invention can be used, are to be counted, as previously already indicated, water soluble organometallic chelate complexes, in the case which, for example, lactic acid, citric acid or tartaric acid behave as chelate complexes. By way of the thermal treatment in the same way the above described chelate complexes can be removed and the hydrolysis of the organometallic components can be enabled.

The advantage of the manufacturing method according to the invention is to be seen in that in a simple way a composite membrane can be manufactured, with the formation of the material-selective separation layer being capable of being made in conventionally available coating apparatus by coating of the support layer. By a setting of the relationship of the polyvinyl alcohol and the organometallic compound the separation performance of the membrane, that is its selectivity and its flow properties, can be directly adjusted. Especially by way of the portion of the organometallic compound and the therefrom existing metal derivatives or of the metal chelate complexes the flow of the permeate through the membrane can especially be adjusted, since as to this the soaking of the material-selective separation layer has an outstanding influence.

A further advantage of the membrane of the invention and of its method of manufacture, is that for the cross-linking of the polyvinyl alcohol no poisonous substances such as glutardialdehyde or isozyanate are used. Especially in regard to the advantages of the membrane made in accordance with the inventive method it is to be noticed that because of the cross-linking with the mentioned organometallic compounds an essentially improved chemical stability at high temperatures is obtained in comparison with previous membranes of this kind.

The membrane of the invention therefore suits itself in outstanding fashion also for a discontinuous carrying out of a later separation process and for use in an apparatus for the carrying out of the separation process as described for example in DE-A-100 02 692. The disclosure of which is incorporated herein by reference.

EXAMPLE 1

The following solutions were made:

Titanate Solution 174.68 g ethanol (water free)
1.36 g tetraethylorthotitanate
11.21 g acetylecetone PVA-Solution
5 g PVA
95 g distilled water Coating Solution 1
250.0 g 5 wt. % PVA-solution
375.80 g distilled water
117.50 g titante solution
Ph=3 (soured by $H_2SO_4$)

Coating Solution 2
120.82 g 5 wt. % PVA-solution
540.26 g distilled water
56.84 g titanate solution
Ph=3 (soured with $H_2SO_4$)

Tetraethylorthotitanate was mixed with water-free ethanol. To this solution was added the corresponding amount of acetylacetone and was agitated for at least one hour at room temperature.

PVA was dissolved in water with agitation at 90° C.

The composite membrane according to the invention was made by applying the coating solution to a porous PAN-membrane by means of a dip coating technique using a coating machine. First the coating solution 1 was applied and after that the coating solution 2 was applied. After each coating procedure the membrane was dried in an air stream at 100° C. At the end of all of the coating processes the membrane was cross-linked for two hours at 180° C.

The so manufactured hydrophilic membrane was tested as to vapor permeation as follows:
Feed Solution: 89 wt. % ethanol/11 wt. % water
Feed Temperature: 78.8° C.
Feed pressure: 1010 mbar
Total flow=1.037 Kg/m² h
α (water/ethanol)=419

EXAMPLE 2

The membrane described under Example 1 was tested as to vapor permeation as follows:
Feed Solution: 89 wt. % ethanol/11 wt. % water
Feed Temperature: 118.2° C.
Feed Pressure: 3962 mbar
Total Flow: 7.56 Kg/m₂ h
α (water/ethanol)=62

What is claimed is:

1. A membrane for the separation of material mixtures according to vapor permeation or pervaporation methods, especially for the dewatering of organic solvents, the membrane comprising at least one support layer and at least one material-selective separation layer on the support layer, the material-selective separation layer comprising organometallic compounds and polyvinyl alcohol, which contain at least one of a metallic element and metallic element derivative and wherein the organometallic compounds are crosslinked with the polyvinyl alcohol.

2. A membrane according to claim 1, further comprising the molecular weight of the polyvinyl alcohol being between about 20,000 and about 200,000 g/mol.

3. A membrane according to claim 2, wherein the molecular weight lies essentially in a region between 100,000 to 150,000 g/mol.

4. A membrane according to claim 1, wherein the polyvinyl alcohol is made by hydrolysis, and has an hydrolysis degree between about 50 and about 100%.

5. A membrane according to claim 4, wherein the hydrolysis degree is between about 98% and about 100%.

6. A membrane according to claim 1, further wherein the polyvinyl alcohol for the formation of the material-selective separation layer is dissolved in a solvent thereby forming a solution.

7. A membrane according to claim 6, wherein the concentration of the solution lies in between about 0.5 wt. % to about a solubility limit of the polyvinyl alcohol.

8. A membrane according to claim 7, wherein the concentration is between about 1 wt. % to about 5 wt. %.

9. A membrane according to claim 1, wherein at least one of the metallic element and its derivative is substantially uniformly distributed in the separation layer.

10. A membrane according to claim 9, wherein the derivative is titanium dioxide Ti02.

11. A membrane according to claim 1, wherein the support layer is formed so as to be porous.

12. A membrane according to claim 1, wherein the support layer is made of at least one of a polymer and a polymer modification.

13. A membrane according to claim 1, wherein the carrier layer is made of an inorganic material.

14. A membrane according to claim 1, wherein the support layer consists of an inorganic/organic blended membrane.

15. A method for making a membrane for the separation of material mixtures by permeation or pervaporation methods, especially for the dewatering of organic solvents, said method comprising the steps of:
providing at least one support layer and at least one material-selective separation layer applied to the support layer;
adding polyvinyl alcohol to a solvent;
adding an organometallic compound to the solvent/polyvinyl alcohol mixture;
applying the solvent/polyvinyl alcohol/organometallic compound mixture to the support layer as a material-selective separating layer; and
complexing the organometallic compound for addition to the solvent/polyvinyl alcohol mixture.

16. A method according to claim 15, wherein the step of complexing results in acetylazation.

17. A method according to claim 15, wherein the organometallic compound is tetraethylorthotitanate or tetraorthopropylenzirkonate.

18. A method according to claim 15, wherein the organometallic compound containing solvent/polyvinyl alcohol/organometallic compound mixture after its application to the support layer together with the support layer is subjected to a thermal treatment.

19. A method according to claim 18, wherein subsequent to the application of the separation layer forming mixture onto the support layer the entire element is subjected to a first thermal treatment at a temperature in the region of 100° for drying.

20. A method according to claim 19, wherein after the first thermal treatment the entire element is subjected to a second thermal treatment at a temperature in the region of about +120° C. to about +200° C., for cross-linking the support layer with the material-selective layer and for the in situ formation of metal oxides in the material-selective layer.

21. A method according to claim 20, wherein the temperature of the second thermal treatment is between about 160° C. and about 180° C.

* * * * *